US007462255B2

(12) United States Patent
Knorr et al.

(10) Patent No.: US 7,462,255 B2
(45) Date of Patent: Dec. 9, 2008

(54) METHOD FOR PRODUCING BY LASER GASTIGHT AND HIGH-TEMPERATURE RESISTANT CONNECTIONS OF SHAPED PARTS MADE OF A NON-OXIDIC CERAMIC

(75) Inventors: Juergen Knorr, Dresden (DE); Wolfgang Lippmann, Dresden (DE); Regine Wolf, Freiberg (DE); Horst Exner, Mittweida (DE); Anne-Maria Reinecke, Mittweida (DE)

(73) Assignees: Technische Universitaet Dresden, Dresden (DE); Management Associates, Hamburg (DE)

( * ) Notice: Subject to any disclaimer, the term of this patent is extended or adjusted under 35 U.S.C. 154(b) by 0 days.

(21) Appl. No.: 11/009,040

(22) Filed: Dec. 13, 2004

(65) Prior Publication Data

US 2005/0167409 A1 Aug. 4, 2005

Related U.S. Application Data

(63) Continuation of application No. PCT/DE03/02056, filed on Jun. 13, 2003.

(30) Foreign Application Priority Data

Jun. 14, 2002 (DE) ................................ 102 27 366

(51) Int. Cl.
*C03C 8/20* (2006.01)
*C03C 8/24* (2006.01)

(52) U.S. Cl. ................. 156/272.8; 264/482; 219/121.85

(58) Field of Classification Search ................................
219/121.63–121.66, 121.68, 121.6, 121.85,
219/85.13, 85.2; 228/124.6; 65/36; 264/482;
156/89.11, 272.8
See application file for complete search history.

(56) References Cited

U.S. PATENT DOCUMENTS

| | | | | |
|---|---|---|---|---|
| 3,876,408 A * | 4/1975 | Geyer | ............................ | 65/36 |
| 4,070,197 A * | 1/1978 | Coes | ........................ | 428/34.4 |
| 4,729,973 A * | 3/1988 | Brockway et al. | .......... | 501/95.2 |
| 4,763,828 A * | 8/1988 | Fukaya et al. | ............ | 228/124.1 |
| 4,798,991 A * | 1/1989 | Benedikt et al. | ............ | 313/137 |
| 5,059,095 A * | 10/1991 | Kushner et al. | ......... | 416/241 B |
| 5,098,494 A * | 3/1992 | Reisman | .................. | 156/89.16 |
| 5,116,786 A * | 5/1992 | Matsuura | ...................... | 501/15 |
| 5,451,279 A * | 9/1995 | Kohinata et al. | ......... | 156/89.27 |
| 5,503,703 A | 4/1996 | Dahotre et al. | | |
| 5,512,327 A * | 4/1996 | Chakraborty | ................ | 427/455 |
| 5,874,175 A * | 2/1999 | Li | ............................... | 428/457 |
| 5,893,328 A * | 4/1999 | Ghosh et al. | ................. | 101/467 |
| 5,912,914 A * | 6/1999 | Dittbenner | ..................... | 372/56 |
| 6,448,777 B1 * | 9/2002 | Abdel-Rahman et al. | ... | 324/464 |
| 6,543,134 B2 * | 4/2003 | Meier | ........................ | 29/889.1 |
| 6,586,704 B1 * | 7/2003 | Cockeram et al. | ...... | 219/121.64 |
| 6,794,320 B1 * | 9/2004 | Parkhill et al. | ................. | 501/20 |
| 7,098,259 B2 * | 8/2006 | Hoescheler et al. | ......... | 523/117 |

FOREIGN PATENT DOCUMENTS

| | | | |
|---|---|---|---|
| DE | 2627993 A1 * | 2/1977 | |
| DE | 003539651 A1 * | 5/1987 | |
| DE | 4116865 | 11/1992 | |
| DE | 19540900 A1 * | 5/1997 | |
| JP | 358032593 A * | 2/1983 | |
| JP | 58-36985 | 3/1983 | |
| JP | 360071913 A * | 4/1985 | |
| JP | 63-225584 | 9/1988 | |
| JP | 05261586 A * | 10/1993 | |
| JP | 07-187836 | 7/1995 | |
| JP | 02001354448 A * | 12/2001 | |
| WO | 03/106374 | 12/2003 | |

OTHER PUBLICATIONS

Database WPI, Section CH, Week 198315, Derwent Publications Ltd., London, GB, Class 102, AN 1983-3552K.
A. Hesse et al., Keramische Zeitschrift, vol. 46, No. 3, 1994, pp. 147-150.
Database WPI, Section Ch, Week 198843, Derwent Publications Ltd., London, GB; Class L02, AN 1988-304859.
Patent Abstracts of Japan, vol. 1995, No. 10, Nov. 30, 1995.
A.-M. Reinecke et al., Lasermagazin, vol. 5, 2002, pp. 18.
M. Boretius et al., VDI-Berichte, vol. 670, pp. 699-713, VDI-Verlag, Dusseldorf, 1988.
B. Wielage et al., VDI-Berichte, vol. 883, pp. 117-136, VDI-Verlag, Dusseldorf, 1991.
S. Harrison et al., Solid Freeform Fabrication Proceedings, Proc. Of the SFF Symp., Austin, USA, Aug. 10-12, 1998, pp. 537-542.
M. Boretius et al., Fugen von Hochleistung-Kermaik, pp. 42-45, 58-73, 76, 77, 80-89, 98-109, 112, 113, 204-207, 220-229, VDI-Verlag.
English Language Abstract of JP 58-36985, Published Mar. 4, 1983.
English Language Abstract of JP 63-225584, Published Sep. 20, 1988.
English Language Abstract of JP 07-187836, Published Jul. 25, 1995.
English Language Translation of JP 58-36985.

\* cited by examiner

*Primary Examiner*—Samuel M Heinrich
(74) *Attorney, Agent, or Firm*—Greenblum & Bernstein, P.L.C.

(57) ABSTRACT

Method for producing by laser gastight and high-temperature resistant connections of shaped parts made of non-oxidic ceramic. The invention relates to the fields of ceramics and laser technology and relates to a method with which, e.g., low-melting-point or radioactive materials can be enclosed inside a container made of ceramic. The object of the invention is to produce a durable, gastight and high-temperature resistant connection between components made of non-oxidic ceramic. Shaped parts made of the ceramic are provided on the surfaces to be joined with a solder of 80-30% by weight yttrium oxide and/or 55-15% by weight zirconium oxide, 20-70% by weight aluminum oxide, 0-50% by weight silicon dioxide and 0-10% by weight silicon, and subsequently the temperature at the joint area is increased above the melting temperature of the solder by means of a laser without the presence of a protective gas atmosphere or a vacuum.

21 Claims, No Drawings

METHOD FOR PRODUCING BY LASER GASTIGHT AND HIGH-TEMPERATURE RESISTANT CONNECTIONS OF SHAPED PARTS MADE OF A NON-OXIDIC CERAMIC

CROSS-REFERENCE TO RELATED APPLICATIONS

The present application is a continuation of International Application No. PCT/DE03/02056, filed Jun. 13, 2003, the disclosure of which is expressly incorporated by reference herein in its entirety, and which published as WO 03/106374 A1 on Dec. 24, 2003, and claims priority of German Patent Application No. 102 27 366.9, filed Jun. 14, 2002.

BACKGROUND OF THE INVENTION

1. Field of the Invention

The invention relates to the fields of ceramics and laser technology and relates to a method for producing by laser gastight and high-temperature resistant connections of shaped parts made of a non-oxidic ceramic, with which, e.g., low-melting-point or radioactive materials can be enclosed in a container made of ceramic.

2. Discussion of Background Information

Welding and soldering methods for joining ceramic and, in particular, heavy-duty ceramics are known (Hesse, A. et al., Keramische Zeitschrift 3 (1994), pp. 147-150; Boretius, M. et al., VDI-Berichte, Volume 670, pp. 699-713, VDI-Verlag, Düsseldorf, 1988).

With these integral joining methods, soldering stands out compared to (diffusion) welding because of lower technological complexity and higher reproducibility and reliability.

Active soldering with metallic solders produces relatively solid bonds. The use of this method with PVD-metallized or laser-treated ceramic achieves, in particular, favorable wetting and flow properties of the solder (Wielage, B. et al., VDI-Berichte, Volume 883, pp. 117-136, VDI-Verlag, Düsseldorf, 1991). With this method, the ceramic is metallized and subsequently brought in contact with the solder in an oven. The temperature is thereby raised above the melting temperature of the solder. In the molten state, the solders wet the metallized ceramic surface and form a solid bond after cooling.

However, in addition to the use of metallic solders, glass/ceramic solders can also be used to join ceramic (Boretius, M. et al., VDI-Verlag, Düsseldorf, 1995). With this method, the workpiece is inserted into an oven and heated to above the melting temperature of the solder while an external force is applied to press together the two parts to be joined. The force is necessary to achieve a sufficient degree of compression in the joint seam and gas tightness. The method in the oven thereby takes place in a protective gas atmosphere or in a vacuum. After reaching its melting temperature, the solder forms a liquid phase which wets the surfaces to be joined and leads to a solid ceramic bond after resolidification. These solders are used, in particular, if there are higher requirements in terms of corrosion resistance and high-temperature stability, but lower requirements in terms of the transmission of mechanical forces.

Glass/ceramic solders wet ceramics well and, in contrast to metallic solders, can thus be used without metallization of the ceramic surface. A further advantage of glass/ceramic solders is the fact that they are gastight. Crystalline glass/ceramic solders are converted into a ceramic, polycrystalline state after solidification. The soldering temperature mostly corresponds to the service temperature. The particular advantage of glass/ceramic solders is the fact that they render possible an adjustment of the coefficient of expansion and the temperature stability of the joint area.

A drawback of this method is that the workpieces have to be adapted to the respective oven with regard to their size, and that materials located inside a ceramic container that is to be sealed by joining are also exposed to high stresses because of the relatively long and high temperature stress. Low-melting-point materials cannot be sealed in such ceramic containers with these technologies.

Furthermore, methods are known for joining ceramics with solders to non-high-temperature-resistant ceramic joints by using a laser, whereby only small components are joined and a vacuum or a protective gas is required as well (Harrison S, et al., Solid Freeform Fabrication Proceedings, Proc. of the SFF Symp. Austin, U.S.A., Aug. 10-12, 1998, (1998) pp. 537-542).

SUMMARY OF THE INVENTION

The object of the invention is to produce a durable, gastight and high-temperature-resistant connection between components made of a non-oxidic ceramic.

The present invention relates to a method for producing gastight and high-temperature resistant connection of shaped parts, the parts made of a non-oxidic ceramic, comprising providing solder at a joint area at surfaces of the shaped parts to be joined, the solder comprising at least one of 80-30% by weight yttrium oxide and 55-15% by weight zirconium oxide, 5-70% by weight aluminum oxide, 0-50% by weight silicon dioxide and 0-10% by weight silicon, and having a melting temperature; subsequently raising a temperature at the joint area above the melting temperature of the solder by a laser, without presence of a protective gas atmosphere or a vacuum, so that a wettability sufficient for realizing connection of the surfaces to be joined is realized at the surfaces to be joined by the melted solder by silicon dioxide that at least one of originates from the ceramic, originates from the solder, is formed and is additionally applied.

The present invention also relates to a method of enclosing a material in a container, comprising placing a material within shaped parts to be joined, the parts made of a non-oxidic ceramic; producing gastight and high-temperature resistant connection of the shaped parts comprising providing solder at a joint area at surfaces of the shaped parts to be joined, the solder comprising at least one of 80-30% by weight yttrium oxide and 55-15% by weight zirconium oxide, 5-70% by weight aluminum oxide, 0-50% by weight silicon dioxide and 0-10% by weight silicon, and having a melting temperature; and subsequently raising a temperature at the joint area above the melting temperature of the solder by a laser, without presence of a protective gas atmosphere or a vacuum, so that a wettability sufficient for realizing connection of the surfaces to be joined is realized at the surfaces to be joined by the melted solder by silicon dioxide that at least one of originates from the ceramic, originates from the solder, is formed and is additionally applied.

The solder can comprise at least one of 80-30% by weight yttrium oxide and 55-15% by weight zirconium oxide, 20-70% by weight aluminum oxide, 0-40% by weight silicon dioxide and 0-10% by weight silicon.

The solder can comprise 50-20% by weight zirconium oxide, 20-70% by weight aluminum oxide, 1-5% by weight silicon dioxide and 1-5% by weight silicon.

The solder can comprise 60-80% by weight yttrium oxide, 20-40% by weight aluminum oxide, 1-5% by weight silicon dioxide and 1-5% by weight silicon.

The solder can be provided at the joint area in solid form, powdery form, strip form, pasty form or as a coating.

The laser can be Nd:YAG laser.

The temperature of the joint area can be raised to a temperature of 1200° C. to 2000° C.

The temperature of the joint area can be raised to a temperature of 1500° C. to 1900° C.

The ceramic that is joined can comprise silicon carbide ceramic.

The solder can be positioned in a depression or groove at the joint area.

The material can comprise a radioactive material.

DETAILED DESCRIPTION OF THE INVENTION

In the method according to the invention for producing by laser gastight and high-temperature-resistant connections of shaped parts made of a non-oxidic ceramic, shaped parts made of the ceramic are provided at the surfaces to be joined with a solder of 80-30% by weight yttrium oxide and/or 55-15% by weight zirconium oxide, 5-70% by weight aluminum oxide, 0-50% by weight silicon dioxide and 0-10% by weight silicon. Subsequently, the temperature at the joint area is raised above the melting temperature of the solder by a laser, without the presence of a protective gas atmosphere or a vacuum, whereby a wettability sufficient for realizing the connection of the surfaces to be joined is realized at the surfaces to be joined by the melted solder by silicon dioxide that originates from the ceramic and/or from the solder and/or that is formed and/or is additionally applied.

Non-oxidic ceramic means all ceramics that do not form melt stage(s) at all or in part.

A reducing agent can also be brought to the contact area via the ceramic or via the solder.

The joint surfaces are those surfaces of the parts to be joined that realize the local holding together of the parts to be joined after the connection has been produced. Within the scope of this invention, joint areas shall mean the volume that comprises the solder to be fused and at least the adjacent joint surfaces. Regularly, this volume also includes the ceramic parts adjacent to the joint surfaces.

On the one hand, the silicon dioxide at the joint area serves to reduce the melting temperature of the solder during the temperature increase and, on the other hand, to realize the required wettability of the joint surfaces through the melted solder. The silicon dioxide proportion can originate from the ceramic and/or from the solder and/or can be formed and/or can be additionally applied.

If silicon carbide ceramic is used, a silicon dioxide layer is present on the surface of the silicon carbide grains due to the manufacturing process, which layer in many cases is sufficient to produce sufficient wettability through the melted solder at the joint surface. Furthermore, depending on the time of the temperature exposure, silicon dioxide diffuses from the ceramic volume surrounding the joint surfaces to the joint surfaces, so that a sufficient amount of silicon dioxide is present at the joint surfaces for the production of a sufficient wettability through the melted solder.

Furthermore, silicon dioxide can be formed through oxidation with the atmospheric oxygen of the SiO that fundamentally evaporates and can condense at the surface of the components and, in particular, on the surface of the joint surfaces. In general, but in particular in the case of the production of a connection of other non-oxidic ceramic, silicon dioxide can also be applied to the joint surfaces in order to realize the necessary amount of silicon dioxide for the production of a sufficient wettability through the melted solder.

Subsequently, the temperature at the joint area is raised by a laser above the melting temperature of the solder, whereby a protective gas atmosphere or a vacuum is omitted.

It is advantageous if a solder of 80-30% by weight yttrium oxide and/or zirconium oxide, 20-70% by weight aluminum oxide, 0-40% by weight silicon dioxide and 0-10% by weight silicon is used.

It is also advantageous if a solder of 50-20% by weight zirconium oxide, 20-70% by weight aluminum oxide, 1-5% by weight silicon dioxide and 1-5% by weight silicon is used.

Advantageously, a solder of 60-80% by weight yttrium oxide, 20-40% by weight aluminum oxide, 1-5% by weight silicon dioxide and 1-5% by weight silicon is used.

It is also advantageous if the solder is used in solid or powdery or in strip form or pasty form or as a coating.

Furthermore, it is advantageous if an Nd:YAG laser is used as a laser.

It is also advantageous if the joint areas are heated to temperatures of 1200° C. to 2000° C.

It is even more advantageous if the joint areas are heated to temperatures of 1500° C. to 1900° C.

It is also advantageous if silicon carbide ceramic is joined as ceramic.

The particular advantage of the invention is that it is possible for the first time to join, in particular, silicon carbide ceramic shaped parts, whereby expressly no protective gas atmosphere or vacuum must be present.

A protective gas atmosphere is hereby understood to be an atmosphere for avoiding oxidation processes, as a rule through inert gas.

The $O_2$ partial counterpressure thus present during joining shifts the phase equilibrium in the joint zone such that the gas formation during joining is reduced and an optimum joint seam is produced.

A further advantage of the invention is that lasers of any type and wavelength can be used. Lasers can be used particularly advantageously if their beam focus does not lie on the surface of the solder at the joint area but higher, so that a more uniform temperature distribution in the solder is achieved.

In the method according to the invention in the first processing step the solder is applied to the joint area on the workpieces that are made of a non-oxidic ceramic which does not form melt stages at all or in part.

Hereby the solder can be applied as a powdery material or as a paste or as a suspension. After drying, the solder remains on the joint area.

The application can be carried out, e.g., by spraying, with a knife, with a die or with a fiber.

It is also possible to position the solder in a depression or a groove at the joint area.

Such methods ensure a directed and volume-adjustable application of the solder to the joint area. At the same time, the method thus can be well mechanized and automated.

In the subsequent processing step, an area at or around the joint area is heated with the laser radiation of a $CO_2$ laser or Nd:YAG laser or a diode laser. To this end, the laser beam is directed to the surfaces of the workpieces, and the heating of the joint seam or areas around the joint seam is advantageously achieved through a relative movement between laser beam and workpieces by, e.g., moving the workpieces with respect to a fixedly positioned laser beam or by deflecting the laser radiation with the aid of optical parts with respect to fixed workpieces, or combinations of both methods. At the same time, the surface temperature is measured by a radiation pyrometer or a similar temperature measuring device. By means of a temperature-dependent laser output control, a defined temperature in the range of the melting temperature of the materials serving to produce the connection is achieved, as well as defined heating and cooling cycles.

Hereby, the surfaces of the workpieces can be heated completely as well as in sections (in the immediate vicinity of the joint surfaces) or one after the other. If only the section in the immediate vicinity of the joint surface is heated, other sections of the workpieces can be cooled. It is thus possible to join workpieces that are at the same time in contact with low-melting-point materials without these low-melting-point materials melting.

After a temperature has been reached in the range of the melting temperature of the materials serving to produce the connection, the connection is produced by an Nd:YAG laser or a $CO_2$ laser or a diode laser.

The invention will be explained in more detail below with reference to an exemplary embodiment.

A silicon carbide ceramic body in the shape of a closed-bottom hollow cylinder with the dimensions: diameter=15 mm and height=50 mm is provided with a lid by using the method according to the invention. Hereby, the ceramic container is filled with a radioactive material.

A solder of 61.75% by weight $Y_2O_3$, 33.25% by weight $Al_2O_3$ and 5% by weight $SiO_2$ in pasty form is spread on the upper cross-sectional surfaces of the ceramic body. Then the lid made of silicon carbide ceramic is put on top. Now the laser beam of an Nd:YAG laser with an output of 500 W is directed at the joint seam. Thereby, a temperature of 1600° C. is produced at the joint seam. During the laser treatment the ceramic body is rotated at a speed of 167 r.p.m. After repeated revolutions of the ceramic body for 30 seconds, the lid is firmly connected to the ceramic body.

The radioactive material is durably enclosed in the ceramic body in a gastight manner.

What is claimed is:

1. A method for producing gastight and high-temperature resistant connection of shaped parts, the parts made of a non-oxidic ceramic, comprising:
   providing solder at a joint area at surfaces of the shaped parts to be joined, the solder comprising at least one of 80-30% by weight yttrium oxide and 55-15% by weight zirconium oxide, 5-70% by weight aluminum oxide, 0-50% by weight silicon dioxide and 0-10% by weight silicon, and having a melting temperature; and
   subsequently raising a temperature at the joint area above the melting temperature of the solder by a laser, without presence of a protective gas atmosphere or a vacuum, to melt the solder and obtain sufficient wettability for connection of the surfaces to be joined by the melted solder by silicon dioxide, the silicon dioxide comprises at least one of silicon dioxide that originates from the ceramic, silicon dioxide that originates from the solder, silicon dioxide that is formed through oxidation with atmospheric oxygen of SiO that evaporates, and silicon dioxide that is applied to the joint area.

2. The method according to claim 1, wherein the solder comprises at least one of 80-30% by weight yttrium oxide and 55-15% by weight zirconium oxide, 20-70% by weight aluminum oxide, 0-40% by weight silicon dioxide and 0-10% by weight silicon.

3. The method according to claim 1, wherein the solder comprises 50-20% by weight zirconium oxide, 20-70% by weight aluminum oxide, 1-5% by weight silicon dioxide and 1-5% by weight silicon.

4. The method according to claim 1, wherein the solder comprises 60-80% by weight yttrium oxide, 20-40% by weight aluminum oxide, 1-5% by weight silicon dioxide and 1-5% by weight silicon.

5. The method according to claim 1, wherein the solder is provided at the joint area in solid form, powdery form, strip form, pasty form or as a coating.

6. The method according to claim 1, wherein the laser is Nd:YAG laser.

7. The method according to claim 1, wherein the temperature of the joint area is raised to a temperature of 1200° C. to 2000°C.

8. The method according to claim 1, wherein the temperature of the joint area is raised to a temperature of 1500° C. to 1900° C.

9. The method according to claim 1, wherein the ceramic that is joined comprises silicon carbide ceramic.

10. The method according to claim 1, wherein the solder is positioned in a depression or groove at the joint area.

11. A method of enclosing a material in a container, comprising:
    placing a material within shaped parts to be joined, the parts made of a non-oxidic ceramic;
    producing gastight and high-temperature resistant connection of the shaped parts comprising:
    providing solder at a joint area at surfaces of the shaped parts to be joined, the solder comprising at least one of 80-30% by weight yttrium oxide and 55-15% by weight zirconium oxide, 5-70% by weight aluminum oxide, 0-50% by weight silicon dioxide and 0-10% by weight silicon, and having a melting temperature; and
    subsequently raising a temperature at the joint area above the melting temperature of the solder by a laser, without presence of a protective gas atmosphere or a vacuum, to melt the solder and obtain sufficient wettability for connection of the surfaces to be joined by the melted solder by silicon dioxide, the silicon dioxide comprises at least one of silicon dioxide that originates from the ceramic, silicon dioxide that originates from the solder, silicon dioxide that is formed through oxidation with atmospheric oxygen of SiO that evaporates, and silicon dioxide that is applied to the joint area.

12. The method according to claim 11, wherein the solder comprises at least one of 80-30% by weight yttrium oxide and 55-15% by weight zirconium oxide, 20-70% by weight aluminum oxide, 0-40% by weight silicon dioxide and 0-10% by weight silicon.

13. The method according to claim 11, wherein the solder comprises 50-20% by weight zirconium oxide, 20-70% by weight aluminum oxide, 1-5% by weight silicon dioxide and 1-5% by weight silicon.

14. The method according to claim 11, wherein the solder comprises 60-80% by weight yttrium oxide, 20-40% by weight aluminum oxide, 1-5% by weight silicon dioxide and 1-5% by weight silicon.

15. The method according to claim 11, wherein the solder is provided at the joint area in solid form, powdery form, strip form, pasty form or as a coating.

16. The method according to claim 11, wherein the laser is Nd:YAG laser.

17. The method according to claim 11, in which the temperature of the joint area is raised to a temperature of 1200° C. to 2000° C.

18. The method according to claim 11, wherein the temperature of the joint area is raised to a temperature of 1500° C. to 1900° C.

19. The method according to claim 11, wherein the ceramic that is joined comprises silicon carbide ceramic.

20. The method according to claim 11, wherein the material comprises a radioactive material.

21. The method according to claim 1, wherein the solder comprises 80-30% by weight yttrium oxide and zirconium oxide, 20-70% by weight aluminum oxide, 0-40% by weight silicon dioxide and 0-10% by weight silicon.

* * * * *